(12) United States Patent
Kleiner et al.

(10) Patent No.: US 10,747,453 B2
(45) Date of Patent: Aug. 18, 2020

(54) METHOD AND APPARATUS FOR BOTTLENECK IDENTIFICATION IN HIGH-PERFORMANCE STORAGE SYSTEMS

(71) Applicant: EMC IP Holding Company LLC, Hopkinton, MA (US)

(72) Inventors: Vladimir Kleiner, Yehud (IL); Vladimir Shveidel, Pardes-Hana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 176 days.

(21) Appl. No.: 16/176,351

(22) Filed: Oct. 31, 2018

(65) Prior Publication Data

US 2020/0133541 A1   Apr. 30, 2020

(51) Int. Cl.
*G06F 11/14*      (2006.01)
*G06F 3/06*       (2006.01)

(52) U.S. Cl.
CPC ............ *G06F 3/0632* (2013.01); *G06F 3/065* (2013.01); *G06F 3/0611* (2013.01); *G06F 3/0653* (2013.01); *G06F 3/0659* (2013.01); *G06F 3/0673* (2013.01); *G06F 11/1456* (2013.01)

(58) Field of Classification Search
None
See application file for complete search history.

(56) References Cited

U.S. PATENT DOCUMENTS 10,051,519 B2 *   8/2018   Gopalan ............... H04L 47/263
2017/0097914 A1 * 4/2017   Craddock ........... G06F 11/0766

* cited by examiner

*Primary Examiner* — Brian R Peugh
(74) *Attorney, Agent, or Firm* — Daly, Crowley Mofford & Murkee, LLP

(57) ABSTRACT

A method is disclosed for configuring a storage system, comprising: identifying at least one synchronous flow that is executed by the storage system, the synchronous flow being executed in response to a plurality of I/O requests that are received at the storage system; identifying a first synchronization object that is used by the synchronous flow, the first synchronization object being configured to control access to a first resource based on availability of one or more first credits for accessing the first resource; identifying at least one background flow that is configured to supply the first credits to the first synchronization object; detecting whether a first latency growth that is associated with the background flow corelates with a second latency growth that is associated with the storage system; and when the first latency growth correlates with the second latency growth, causing the storage system to increase a rate at Which the first credits are supplied to the first synchronization object by the background flow.

20 Claims, 13 Drawing Sheets

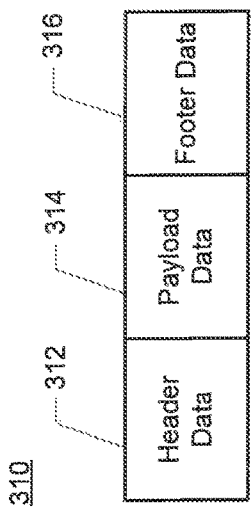
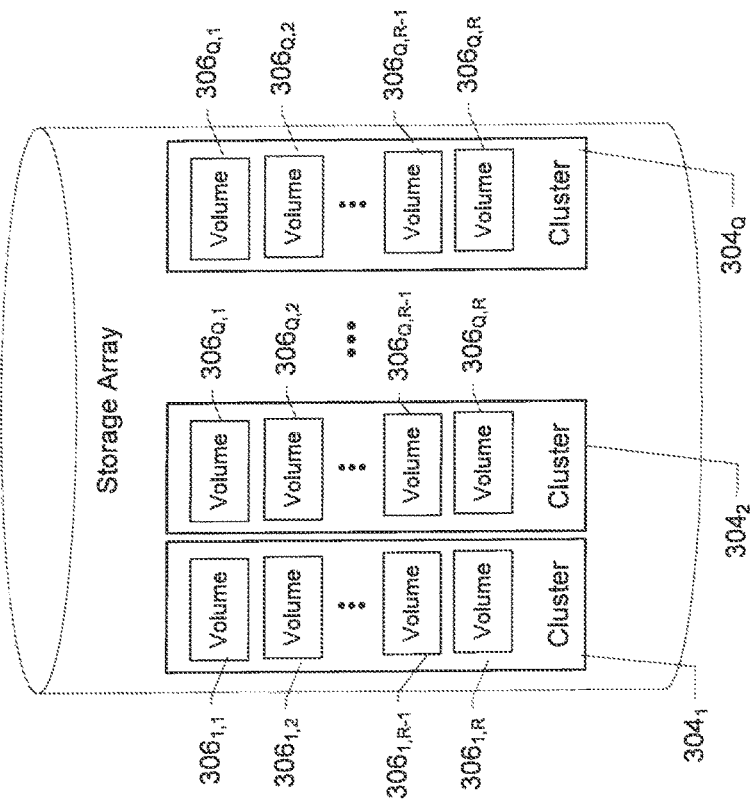
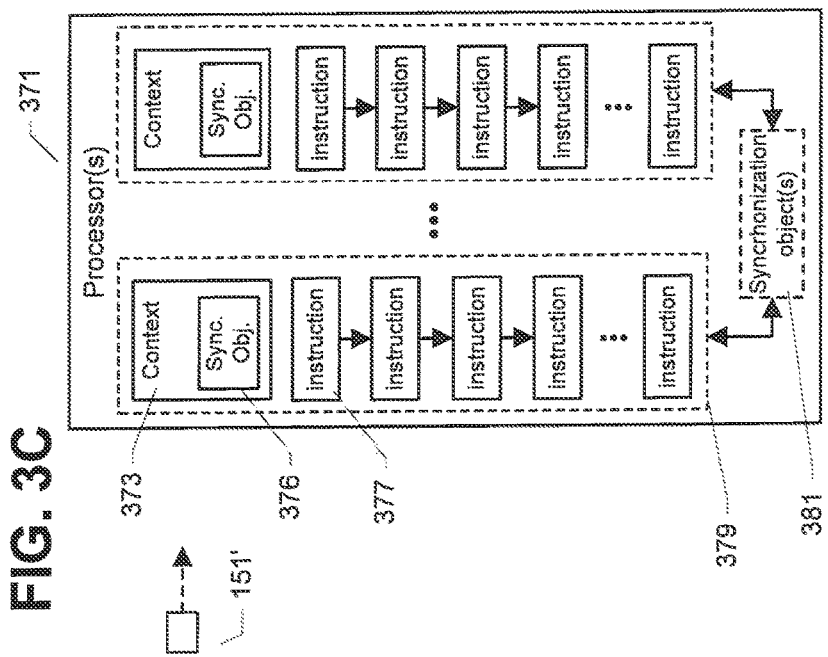

400

420

METHOD AND APPARATUS FOR BOTTLENECK IDENTIFICATION IN HIGH-PERFORMANCE STORAGE SYSTEMS

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided for configuring a storage system to improve performance, comprising: identifying at least one synchronous flow that is executed by the storage system, the synchronous flow being executed in response to a plurality of I/O requests that are received at the storage system; identifying a first synchronization object that is used by the synchronous flow, the first synchronization object being configured to control access to a first resource based on availability of one or more first credits for accessing the first resource; identifying at least one background flow that is configured to supply the first credits to the first synchronization object; detecting whether a first latency growth that is associated with the background flow corelates with a second latency growth that is associated with the storage system; and when the first latency growth correlates with the second latency growth, causing the storage system to increase a rate at which the first credits are supplied to the first synchronization object by the background flow.

According to aspects of the disclosure, a system is provided comprising: a memory; and one or more processors operatively coupled to the memory, configured to: identify at least one synchronous flow that is executed by a storage system, the synchronous flow being executed in response to a plurality of I/O requests that are received at the storage system; identify a first synchronization object that is used by the synchronous flow, the first synchronization object being configured to control access to a first resource based on availability of one or more first credits for accessing the first resource; identify at least one background flow that is configured to supply the first credits to the first synchronization object; detect whether a first latency growth that is associated with the background flow corelates with a second latency growth that is associated with the storage system; and when the first latency growth correlates with the second latency growth, cause the storage system to increase a rate at which the first credits are supplied to the first synchronization object by the background flow.

According to aspects of the disclosure, a non-transitory computer-readable medium is provided that stores one or more processor-executable instructions, which when executed by one or more processors cause the one or more processors to perform the operations of: identifying at least one synchronous flow that is executed by a storage system, the synchronous flow being executed in response to a plurality of I/O requests that are received at the storage system; identifying a first synchronization object that is used by the synchronous flow, the first synchronization object being configured to control access to a first resource based on availability of one or more first credits for accessing the first resource; identifying at least one background flow that is configured to supply the first credits to the first synchronization object; detecting whether a first latency growth that is associated with the background flow corelates with a second latency growth that is associated with the storage system; and when the first latency growth correlates with the second latency growth, causing the storage system to increase a rate at which the first credits are supplied to the first synchronization object by the background flow.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

FIG. 3A is a block diagram of an example data packet of an input/output (I/O) operation of the storage system of FIG. 1 in accordance with an illustrative embodiment;

FIG. 3B is a block diagram of an example storage army of the storage system of FIG. 1 in accordance with an illustrative embodiment;

FIG. 3C is a block diagram showing example threads of the storage system of FIG. 1 in accordance with an illustrative embodiment;

DETAILED DESCRIPTION

Figure 1:
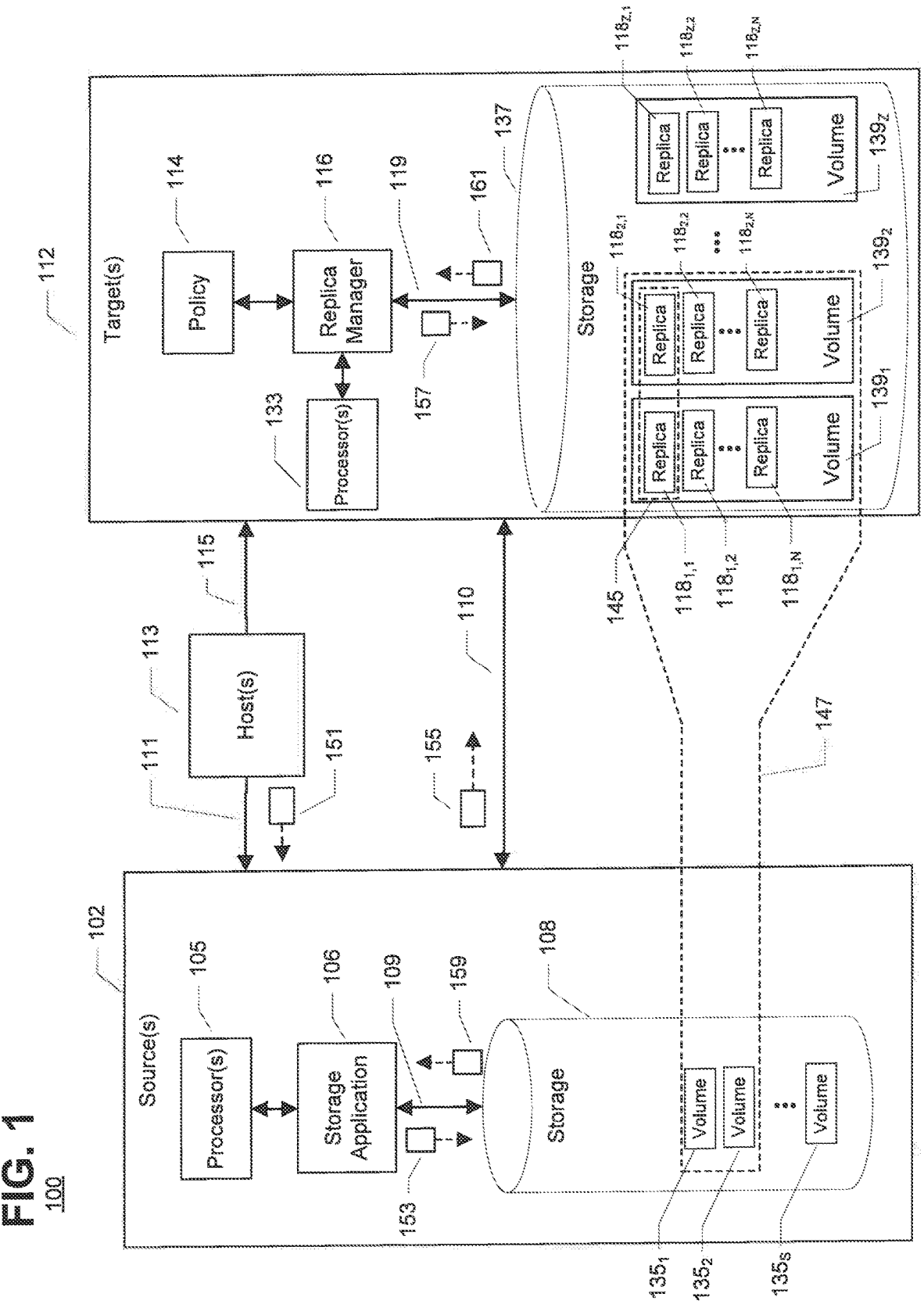
FIG. 1 is a block diagram of an example of a storage system in accordance with an illustrative embodiment.

FIG. 1 shows an example storage system 100, in accordance with illustrative embodiments. Storage system 100 may include at least one source site 102 and at least one target site 112, which may be co-located or geographically separated. Source site 102 may include one or more processors 105, storage application 106, and storage 108. In some embodiments, storage 108 may include one or more storage volumes $135_{1-S}$, that operate as active or production volumes. Source site 102 and target site 112 may be in communication with one or more hosts 113 via communication links 111 and 115, respectively.

Hosts 113 may perform input/output (110) operations on source-side storage 108 (e.g., read data from and write data to storage 108). In some embodiments, the I/O operations may be intercepted by and controlled by storage application 106. As changes are made to data stored on. storage 108 via the I/O operations from hosts 113, or over time as storage system 100 operates, storage application 106 may perform operations to replicate data from source site 102 to target site 112 over communication link 110. In some embodiments, communication link 110 may be a long distance communication link of a storage area network (SAN), such as an Ethernet or Internet (e.g., TCP/IP) link that may employ, for example, the iSCSI protocol, In some embodiments, one or both of source site 102 and/or target site 112 may include one or more internal (e.g., short distance) communication links (shown as communication links 109 and 119), such as an InfiniBand (IB) link or Fibre Channel (FC) link. Communication link 109 may be employed to transfer data between storage volumes $135_{1-S}$ of storage 108 and one or both of storage application 106 and processor(s) 105. Communication link 119 may be employed to transfer data between storage volumes $139_{1-Z}$ of storage 137 and one or both of replica manager 116 and processor(s) 133.

In illustrative embodiments, target site 112 may include replica manager 116 that manages a plurality of replicas $118_{1-N}$ according to a policy 114 (e.g., a replication and/or retention policy), Replicas 118 may be stored in one or more volumes $139_{1-Z}$ of storage 137 of target site 112. A replica (or snapshot) may be created from data within storage 108 and transferred to one or more target sites 112 during a data replication cycle that may he performed based on data replication policies (e.g., policy 114) that may define various settings for data recovery operations, A data replication cycle may be asynchronous data replication performed at time-based intervals during operation of storage system 100, or may alternatively be synchronous data replication performed when data is changed on source site 102.

In illustrative embodiments, storage system 100 may include one or more consistency groups. A consistency group 147 may include one or more volumes 135 of source site 102, each associated with a corresponding volume 139 of target site 112. Consistency group 147 may treat source volumes 135 and target volumes 139 as a single logical entity for data replication and migration. Each volume 139 may store one or more associated replicas 118 that reflect the data in the consistency group 147 at a point in time (e.g., when the replica 118 was created). For example, replicas (e.g., snapshots) 118 may be generated for each source volume 135 of consistency group 147 at the same time, and stored on associated ones of target volumes 139. As shown in FIG. 1, an illustrative consistency group 147 may include two source volumes $135_1$ and $135_2$ and two target volumes $139_1$ and $139_2$. Each of target volumes $139_1$ and $139_2$ may include one or more replicas 118. In some embodiments, replicas 118 for respective source volumes 135 of consistency group 147 may be grouped into sets (e.g., a snapshot set or snapset 145).

Figure 2:
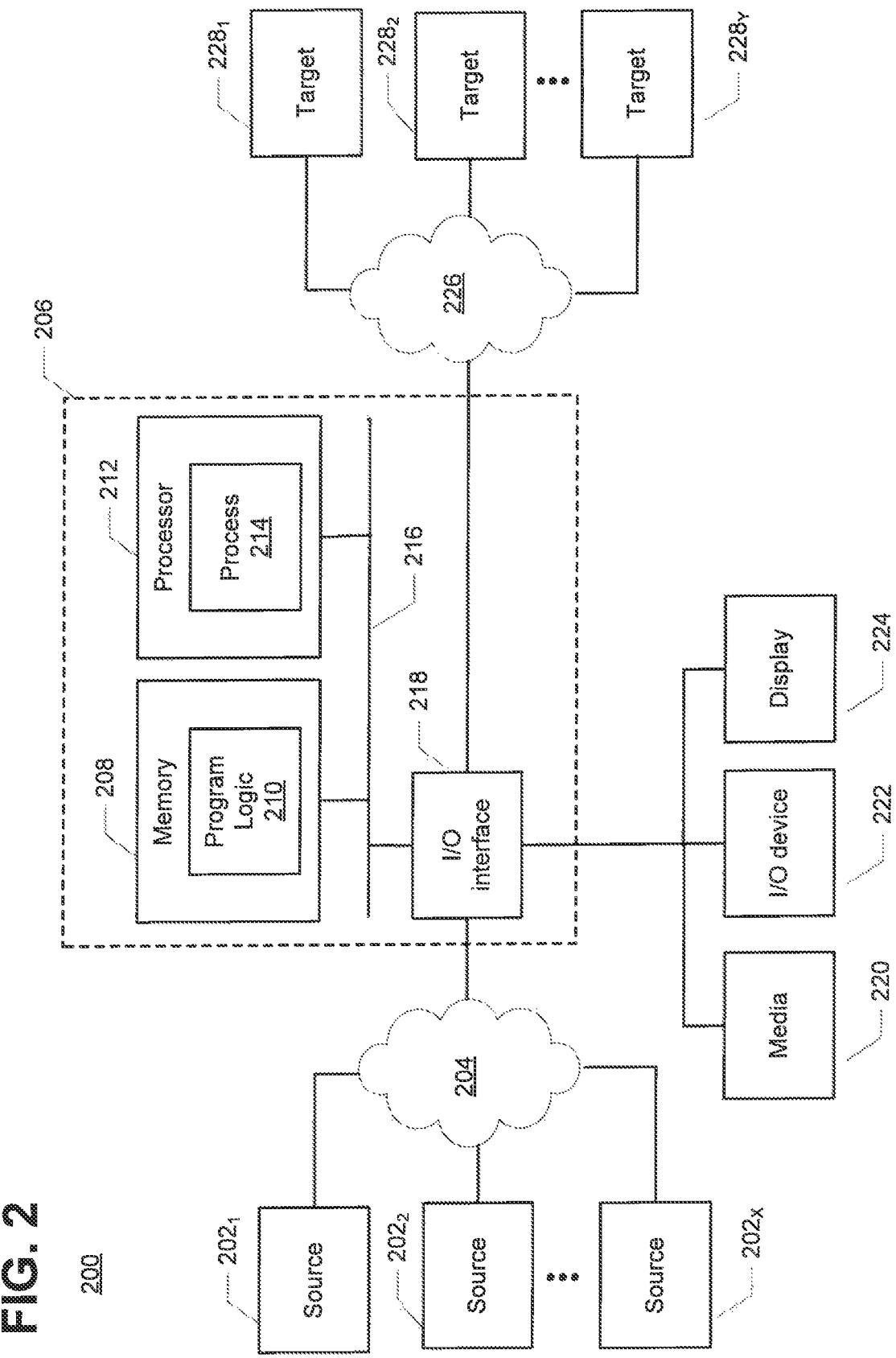
FIG. 2 is a block diagram of another example of a storage system in accordance with an illustrative embodiment.

Referring to FIG. 2, in an illustrative embodiment, apparatus 206 may form part of system 200 and include memory 208 storing program logic 210, processor 212 for executing process 214, and communications I/O interface 218, connected via a bus 216 to allow communication between memory 208, processor 212 and devices external to apparatus 206. For example, in some embodiments, communications I/O interface 218 may be coupled to apparatus 206, external media 220, one or more I/O devices 222, and a display device 224. In some embodiments, communications I/O interface 218 may couple apparatus 206 to one or more source devices $202_1$-$202_X$ via network 204. In some embodiments, communications I/O interface 218 may couple apparatus 206 to one or more target devices $228_1$-$228_Y$ via network 226. In some embodiments, network 226 of FIG. 2 may be a communication fabric between volumes of targets 228. For example, in some embodiments, network 226 may be an InfiniBand (IB) network or a Fibre Channel (FC) network.

Referring back to FIG. 1, in some embodiments, one of hosts 113 may send an I/O request (e.g., I/O request 151) to perform an I/O operation on storage 108 of source site 102. For example, I/O request 151 may be a request to read an associated amount of data from storage 108, or may be a request to write an associated amount of data to storage 108. In some embodiments, I/O request 151 may include one or more data packets. For example, FIG. 3A shows a block diagram of an illustrative data packet 310. As shown in FIG. 3A, in some embodiments, data packet 310 may include one or more of header data 312, payload data 314 and footer data 316. Payload data 314 may be the data to be written to storage 108 or data that is read from storage 108 (e.g., user data), and header data 312 and/or footer data 316 may be data associated with I/O request 151 that may be employed by storage system 100 to process I/O request 151 (e.g., source and/or destination address information, error correction information, data and/or packet format information, metadata, and other information).

In some embodiments, payload data 314 may be segmented into one or more payload data segments to be written to storage 108 (e.g., by one or more write operations 153) or read from storage 108 (e.g., by one or more read operations 159). For example, if payload data 314 is 256 KB, payload data 314 may be segmented into sixteen 16 KB payload data segments to be written to storage 108. When I/O request 151 is a write request, processor(s) 105 and/or storage application 106 may then perform one or more corresponding write operations (e.g., write operation 153) to write payload data associated with the one or more data packets (e.g., one or more payload data segments) of I/O request 151 to storage 108. When I/O request 151 is a read request, processor(s) 105 and/or storage application 106 may then read data from storage 108 in one or more packets (e.g., one or more read operations 159) to process I/O request 151 from storage 108.

In illustrative embodiments, source site 102 may send a replica (e.g., replica 155) to target site 112. Similarly to write request 151, replica 155 may include one or more data packets such as shown in FIG. 3A. Processor(s) 133 and/or replica manager 116 may then perform one or more corresponding write operations (e.g., write operation 157) to write payload data (e.g., one or more payload data segments) associated with the one or more data packets of replica 155 to storage 137. Similarly, replica manager 161 may read replica data from storage 137 by one or more read operations 161. In some embodiments, data packet 310 may be a data packet formatted in accordance with the TCP/IP and iSCSI protocols.

Referring to FIG. 3B, a block diagram of an illustrative storage array 302 is shown. For example, in illustrative embodiments, one or both of storage 108 and storage 137 may be implemented as storage array 302. As shown, in some embodiments, storage array 302 may include one or more clusters $304_1$-$304_Q$ (referred to generally as clusters 304) where Q may be a positive integer. In illustrative embodiments, clusters 304 may include one or more physical and/or virtual storage volumes, shown generally as storage volumes 306. For example, cluster $304_1$ may include storage volumes $306_{1,1}$-$306_{1,R}$, where R may be a positive integer. For example, clusters 304 may include one or more physical storage volumes such as hard disk drives (HDDs), solid state drives (SSDs) such as flash drives, a hybrid magnetic and solid state drive, etc., and/or one or more virtual storage volumes, such as a cloud storage, or a combination of physical storage volumes and virtual storage volumes.

Described embodiments provide performance analysis of storage system 100. Some embodiments may employ one or more performance counters associated with resources of storage system 100 (e.g., CPU resources, operating system resources, etc.), and one or more application-specific or task-specific performance counters associated with individual applications, services or tasks of storage system 100. Described embodiments provide a manner for identifying relationships between the various performance counters and the application flow without requiring manual instrumentation upgrades with each new version of operating system (OS) software for storage system 100.

Described embodiments may employ one or more threads to perform operations of storage system 100 (e.g., operations associated with I/O request 151). For example, as shown in FIG. 3C, processors 371 (e.g., one or more or processors 105 and/or processors 133) may employ one or more threads 379. Each thread 379 may be a thread of one or more instructions 377 that are performed by storage system 100. Each thread 379 may also include context 373. Context 373 may include one or more synchronization objects 376. In some embodiments, threads 379 may optionally be in communication with one or more external synchronization objects 381. For example, synchronization objects 376 and/or 381 may include a lock, a semaphore, or an event, by which threads may communicate with one another.

Illustrative embodiments may monitor performance of threads (e.g., 379) that are grouped by the application-level task the threads perform. For example, some embodiments may group threads based on the thread's entry function and/or an additional operation code.

Some embodiments may monitor performance of tasks using directed-graphs (diagrams). The performance data may be collected in one or more points-of-interest into performance data containers. Performance data containers may be presented as nodes and edges of the directed-graph related to a specific task. For example, a performance data container may be represented as a node of a directed-graph for a specific task. An example of a performance data container that may be represented as a node is an OS synchronization object (e.g., synchronization objects 376 and/or 381 of FIG. 3C), Sequences of processor instructions (e.g., instructions 377 of FIG. 3C) between two nodes may be represented as edges of a directed-graph for a specific task. Since each node represents a system resource, data structure or a stage of processing for a given task, the directed-graph provides a visual representation of processing flows for a given task.

Figure 6:
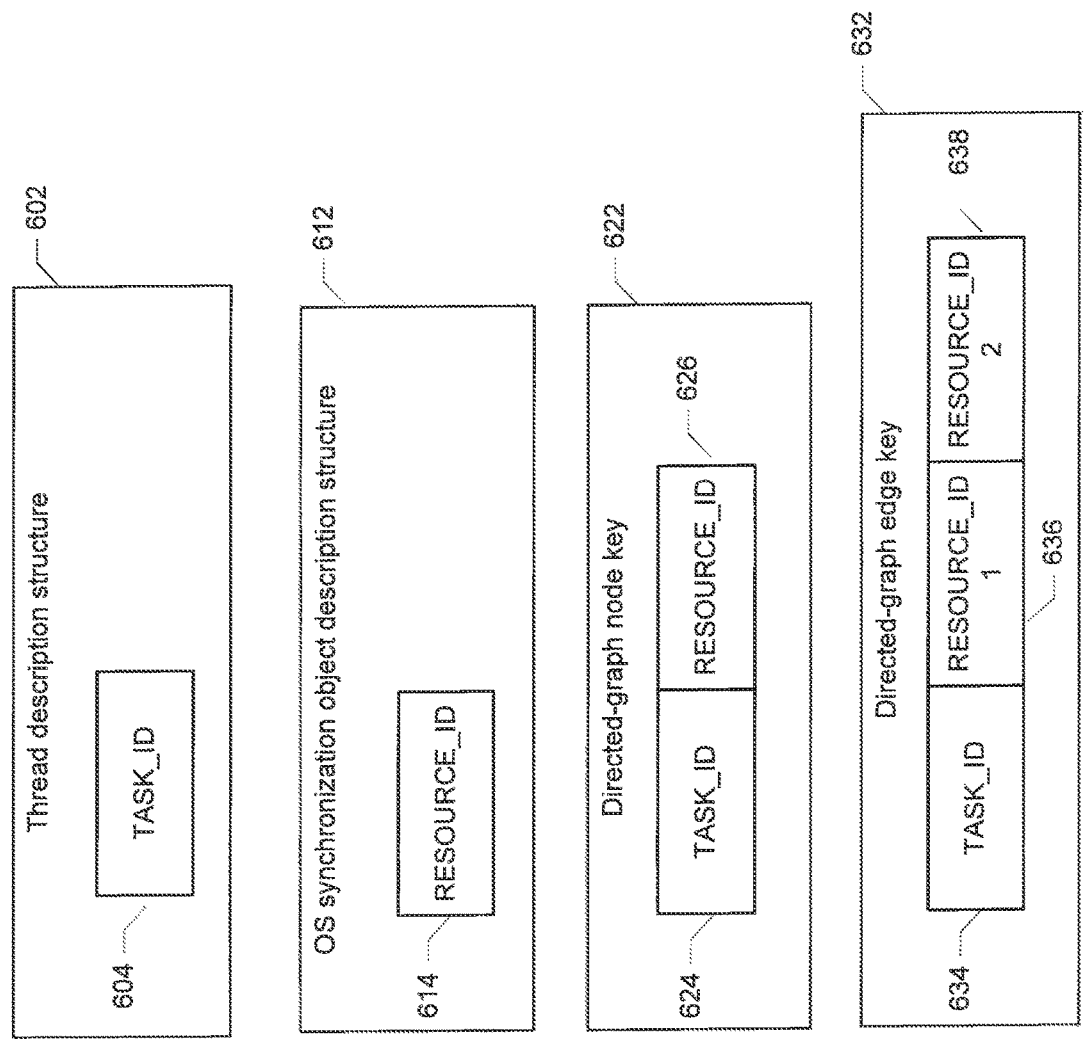
FIG. 6 is a block diagram of illustrative data structures of a performance snapshot in accordance with an illustrative embodiment.

Referring to FIG. 6, illustrative data structures employed to track the performance of storage system 100 are shown. As shown, thread description structure 602 may include an associated TASK_ID 604. OS synchronization object description structure 612 may include an associated RESOURCE_ID 614. Directed-graph node key 622 may include an associated TASK_ID 624 and an associated RESOURCE ID 626, and directed-graph edge key 632 may include an associated TASK_ID 634, an associated first RESOURCE_ID 636, and an associated second RESOURCE_ID 638 that define the sequence of instructions between two resource nodes of the directed-graph. In some implementations, performance data counters are collected for each graph node and for each graph edge.

Figure 7:
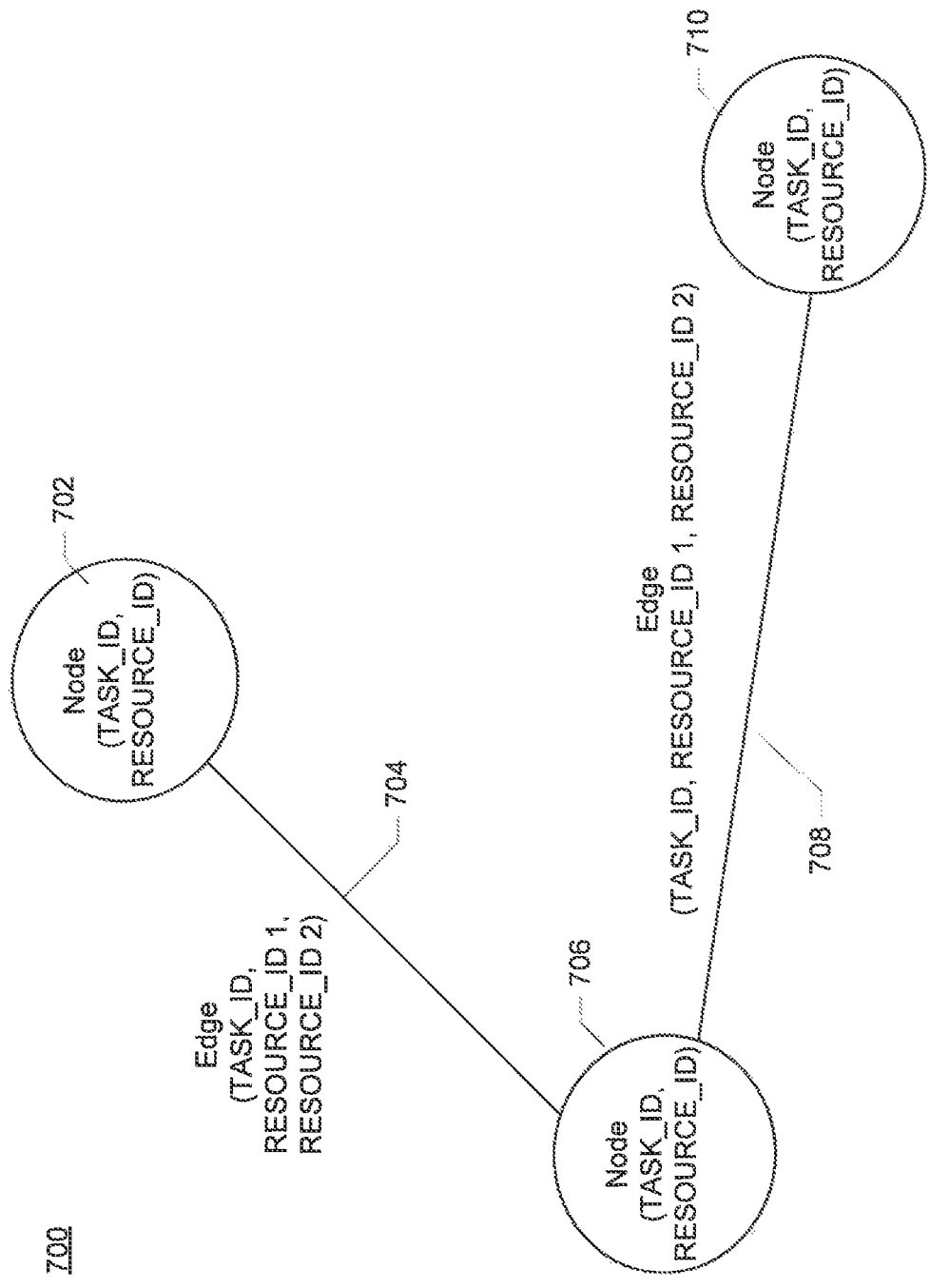
FIG. 7 is an illustrative task-specific directed-graph showing performance of the storage system in accordance with an illustrative embodiment.

Referring to FIG. 7, an illustrative directed-graph 700 is shown. As shown in FIG. 7, directed-graph 700 may include one or mode nodes, for example shown as nodes 702, 706, and 710. Each of nodes 702, 706, and 710 may have an associated key (e.g., 622 of FIG. 6) that is based upon a TASK_ID and RESOURCE_ID associated with the given node. As shown, two nodes may be joined by an associated edge, such as edges 704 and 708. In some implementations, each of edges 704 and 708 has an associated key (e.g., 632 of FIG. 6) that is based upon a TASK_ID, a first RESOURCE_ID, and a second RESOURCE_ID associated with the given node.

In described embodiments, threads may be in one of three main operating states: RUNNING, READY, or SUSPENDED. The RUNNING operating state indicates that the thread is presently running, while the READY operating state indicates that the thread is ready to be performed, but is waiting for processor resources to be available, and the SUSPENDED operating state indicates that the thread is stopped (e.g., suspended) at a synchronization object. Described embodiments may update the one or more performance counters when a thread transitions between operating states.

Described embodiments may collect application level performance data without much instrumentation (e.g., low-impact) by employing the performance counters. In accordance with the present example, performance counters are updated based upon operating state transitions of given threads, such that updating the performance counters may not require much system resources or complex tracking mechanisms. Further, described embodiments provide for performance tracking functionality that may be upgradable with versions of software operating on storage system 100. For example, the one or more performance counters may be implemented in a thread scheduler operating in storage system 100 (e.g., in one of processors). In some implementations, performance counters may be accomplished by introducing new TASK IDs and new RESOURCE_IDs into the system as part of the thread creation or resource utilization. These new IDs may then be automatically included into the performance tracking system.

The one or more performance counters collected for each performance data container may vary based upon a setup of storage system 100. Some embodiments may employ performance counters to collect data for each directed-graph node, and the performance counters may include counters for accumulating a number of accesses, accumulating a number of requested units (for tradeoff between the time-precision of the performance tracking and the system resources consumed by generating snapshots. In some embodiments, the snapshot interval may be a value set by a user of storage system 100. In some embodiments, the snapshot interval may be dynamically adjusted by storage system 100 based upon one or more operating conditions of the storage system (e.g., availability of processor 105 and/or 133, available space of storage 108 and/or 137, etc.).

Performance data containers may be identified by unique keys. In described embodiments, the keys may be based upon, a globally (e.g., within storage system 100) unique task identifier (TASK_ID) associated with the task, and a globally unique resource identifier (RESOURCE_ID) associated with a resource. For example, a thread description structure associated with each unique thread may include a field indicating the TASK_ID associated with the given thread. Similarly, each OS synchronization object (e.g., synchronization objects 376 and/or 381 of FIG. 3C) may have an associated description structure that may include a field indicating the RESOURCE_ID of the given synchronization object.

The keys for the directed-graph nodes may be two-tuples based upon the corresponding TASK_ID and RESOURCE_ID, and the keys for the directed-graph edges (e.g., sequences of processor instructions between two nodes) may be three-tuples based upon the TASK_ID and the RESOURCE_IDs for each of the two nodes that define the given edge.

Referring back to FIG. 4, a flow diagram of an illustrative process for operating storage system 100 of FIG. 1 is shown as process 400. At block 402, process 400 starts, for example when storage system 100 is powered on. At block 404, storage system 100 initializes one or more resource-specific performance counters and one or more application-specific performance counters to track performance of storage system 100. At block 406, storage system 100 generates one or more threads to operate the storage system. At block 408, storage system 100 monitors a state of each thread (e.g., RUNNING, READY, or SUSPENDED). At block 410, if the state of a given thread has changed, then at block 412, the performance counters of storage system 100 may be updated.

Process 400 returns to block 406 as threads are created and processed to operate storage system 100. If, at block 410, the state of a given thread has not changed, then process 400 returns to block 408.

As indicated by the dashed line, snapshot process 414 may be performed concurrently with (e.g., in parallel with) blocks 406, 408, 410, and 412 of process 400. At block 416, a snapshot interval may be started for generating a snapshot of the performance data. If, at block 418, the snapshot interval is complete, then at block 420, a snapshot of the performance data may be generated. Block 420 is described in greater detail in regard to FIG. 5. Snapshot process 414 returns to block 416 to begin a subsequent snapshot interval. Processes 400 and 414 may continue to operate until storage system 100 is powered off.

Figure 4:
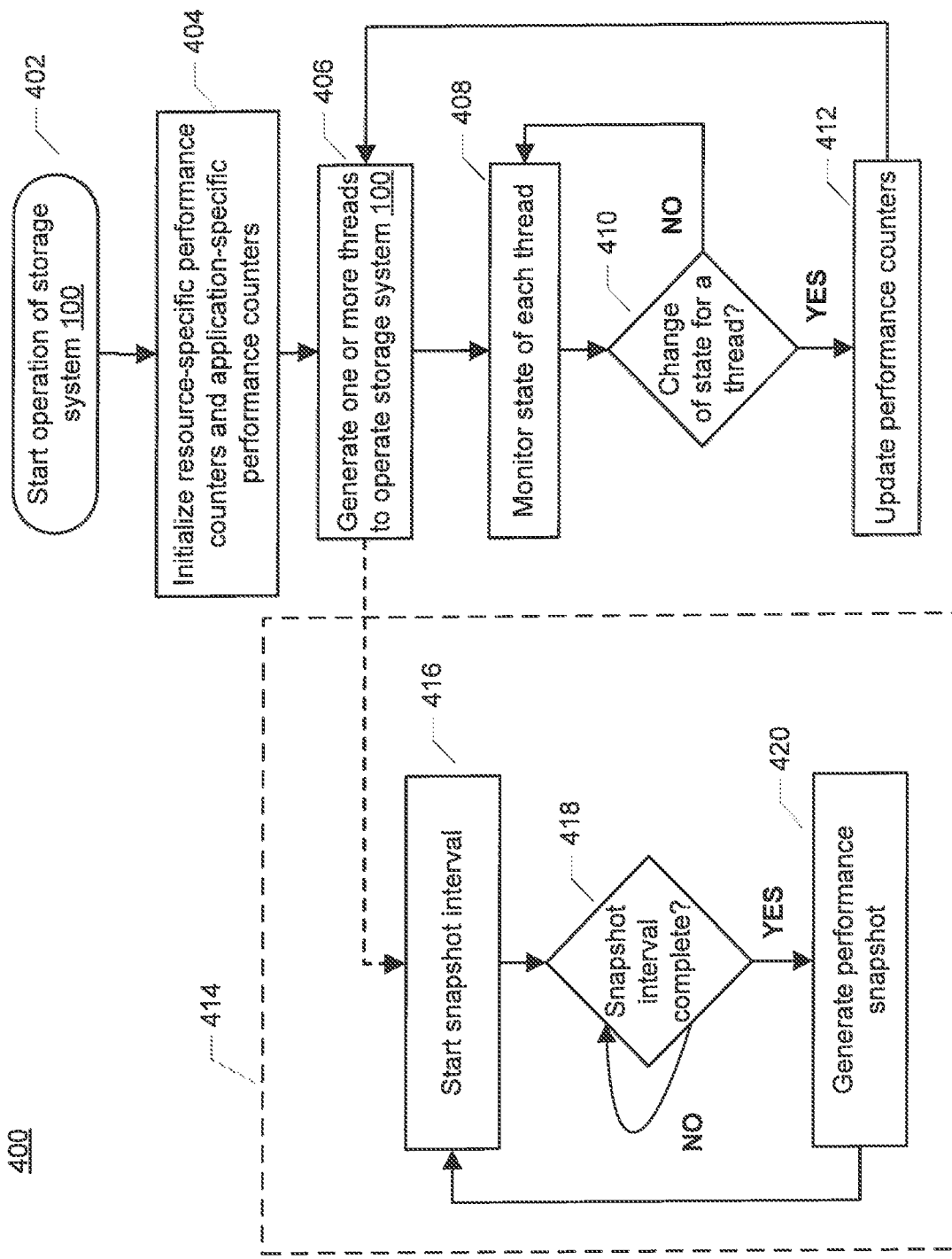
FIG. 4 is a flow diagram of an example of a process to operate the storage system of FIG. 1 in accordance with an illustrative embodiment.
Figure 5:
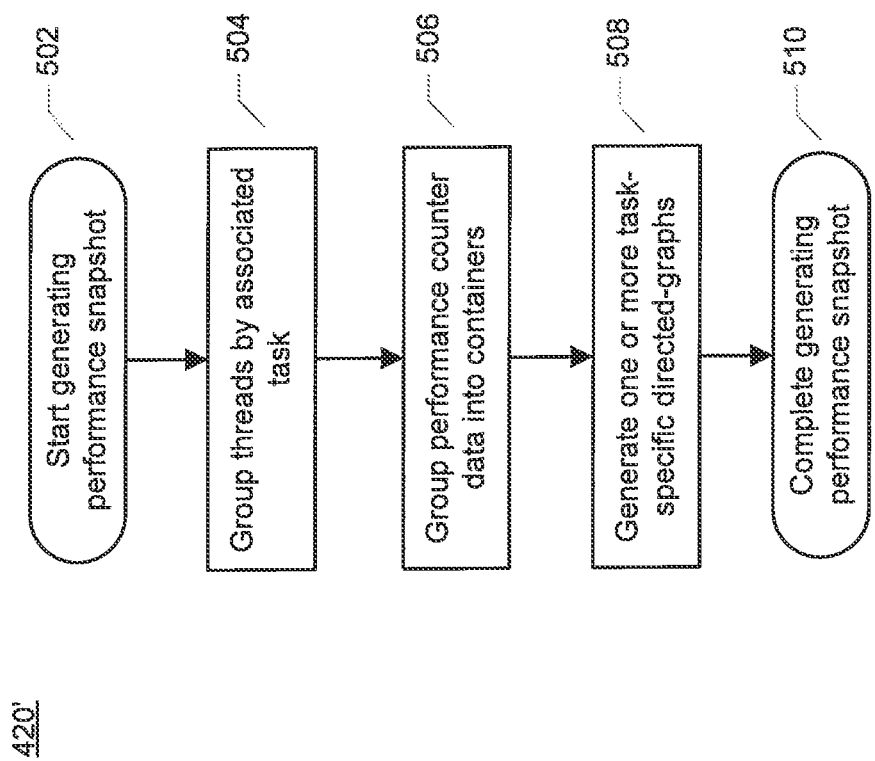
FIG. 5 is a flow diagram of an example of a process to generate a performance snapshot in accordance with an illustrative embodiment.

FIG. 5 shows additional detail of block 420 of FIG. 4 for generating a snapshot of the performance data, shown as process 420'. As shown in FIG. 5, process 420' may start at block 502. At block 504, storage system 100 may group one or more threads by a task associated with each thread. At block 506, performance data is grouped into one or more related performance data containers. For example, as described herein, a performance data container may be associated with an OS synchronization object. At block 508, one or more task-specific directed-graphs may be generated and provided to a user of storage system 100. At block 510, process 420' completes.

Figure 8A:
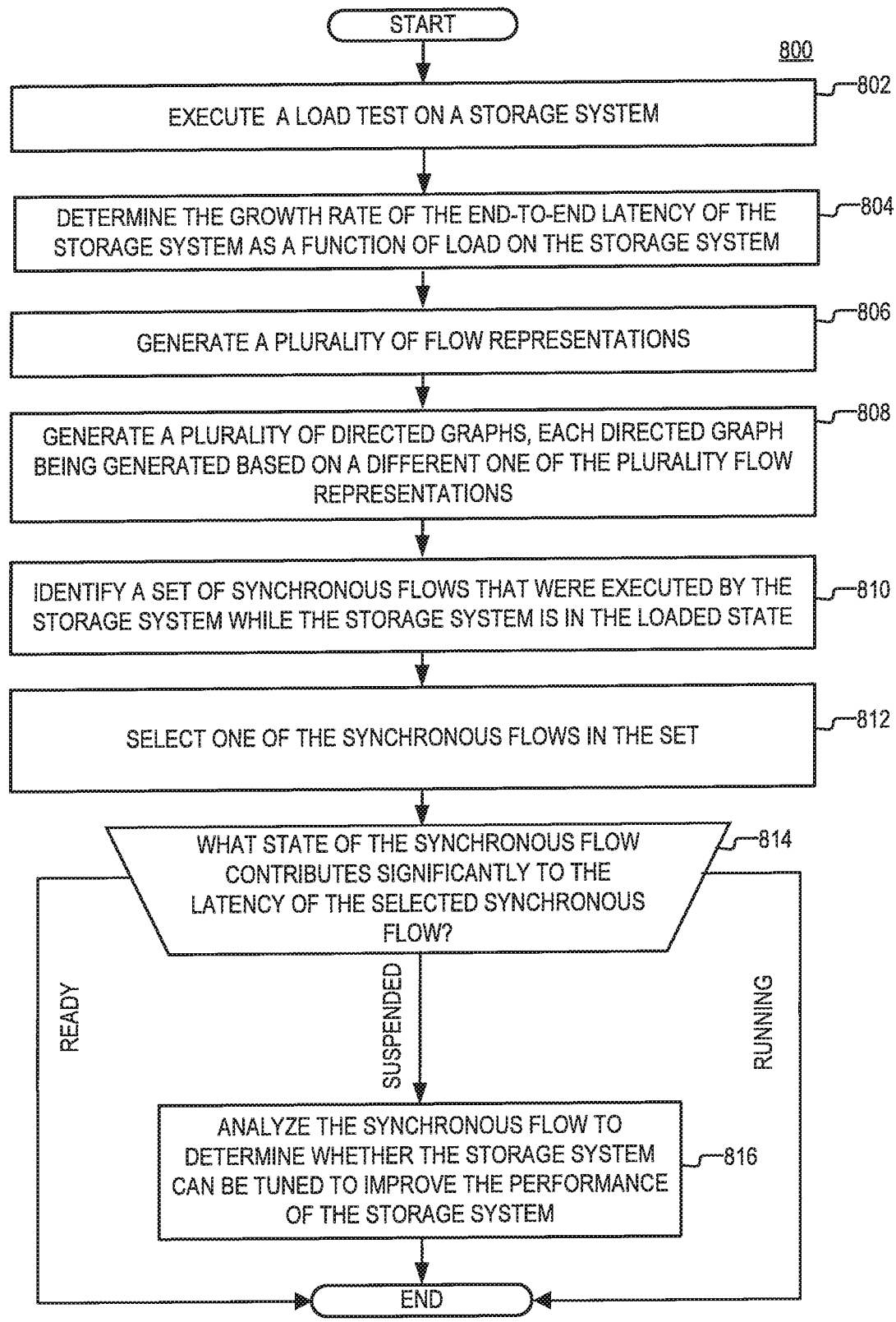
FIG. 8A is a flowchart of an example of a process, according to aspects of the disclosure.

FIG. 8A is a flowchart of an example of a process 800 for analyzing and/or configuring a storage system to improve the storage system's performance, according to aspects of the disclosure.

Figure 8B:
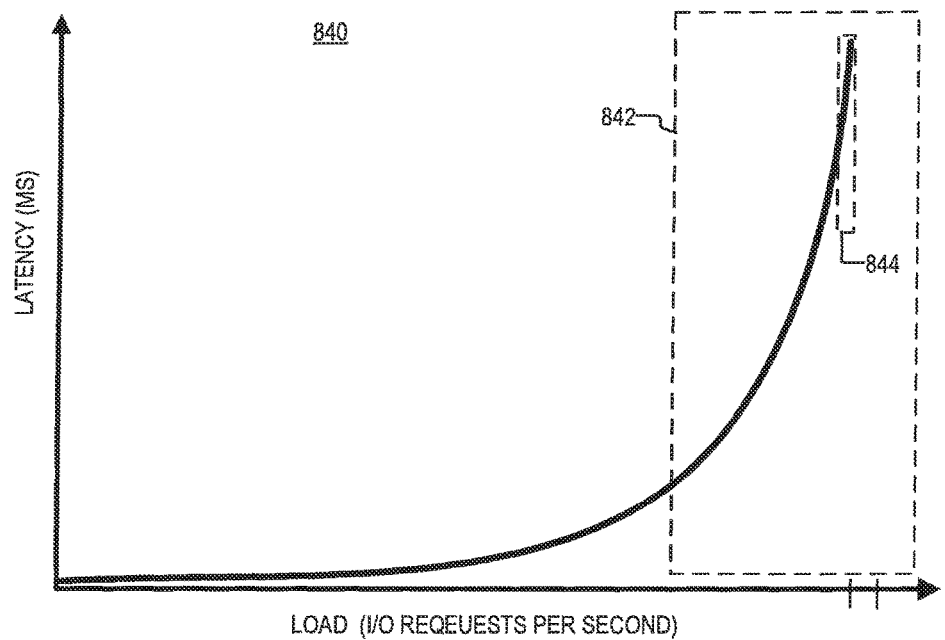
FIG. 8B is a plot illustrating a relationship between a rate at which I/O requests are received at the storage system and the latency of the storage system, according to aspects of the disclosure.

At step 802, a load test is performed on a storage system. The storage system may be any suitable type of integrated or distributed storage system, such as the storage system 100. As illustrated by the plot 840, which is shown in FIG. 8B, performing the load test may include gradually increasing the rate at which I/O requests are provided to the storage system and monitoring the rate at which the end-to-end latency of the storage system is increased in response. In some implementations, the end-to-end latency of the storage system may include any measure that is at least in part indicative of how fast one or more requests are executed by the storage system.

At step 804, the growth rate of the end-to-end latency of the storage system during the load test is determined. As illustrated in plot 840, during the initial stages of the load test, the end-to-to latency of the storage system grows slowly in proportion to the load. When the load on the storage system is between a first level L1 and a second level L2, the latency of the storage system begins to increase faster and faster. so that when the load on the storage system exceeds the second level L2, the latency of the storage system continues to grow even when the load on the system is held approximately constant. In some aspects, the growth rate of the end-to-latency of the storage system may be compared to the growth rate of the latencies of synchronous flows to identify bottlenecks in the storage system. The manner in which the comparison is performed is discussed further below.

At step 806, a plurality of flow representations is generated for flows that are executed by the storage system while the load test is being performed. Any of the generated flow representations may be either an individual flow representation or a combined synchronous flow representation. According to aspects of the disclosure, each flow may include either (i) only one thread that is executed by the storage system, or (ii) a set of threads that have the same entry function, and/or the same opcode. In this regard, each flow representation may include one or more performance data containers that contain a portion (or a subset) of the performance data collected during the execution of the load test, and each flow representation may be associated with either: (i) only one thread or (ii) a set of threads that have the same entry function, and/or the same opcode. In some implementations, the threads in the set may have the same TASK_ID. The TASK_ID of the set of threads may be based on the entry function (identifier) and/or opcode of the threads. In some implementations, any of the performance data containers that constitute a given flow representation may also include (or be otherwise associated with) the TASK_ID of the set of threads that are associated with the given flow representation. In some implementations, the performance data containers that constitute a given flow representation may include one or more types of performance data. The performance data may be collected using performance counters in the manner discussed with respect to FIGS. 1-7. As noted above, while a given thread is executing, each performance counter may collect performance data and store the collected data in one or more performance data containers that are associated with the same TASK_ID as the given thread.

In some implementations, the performance data in any of the performance data containers that constitute a flow representation may indicate one or more of: (i) a duration for which the flow has been in a "ready" state during the execution of the flow; (ii) a duration for which the flow has been in a "suspended" state during the execution of the flow, and (iii) a duration for which the flow has been in a "running" state during the execution of the flow, (iv) a duration for which a thread that is part of the flow has been in a "ready" state during the execution of the thread; (v) a duration for which the thread that is part of the flow has been in a "suspended" state during the execution of the thread, and (vi) a duration for which the thread that is part of the flow has been in a "running" state during the execution of the thread. In some implementations, the duration for which a flow has been in a given state (e.g., a suspended state) may be determined based on the sum of the durations for which the threads that are part of the flow were in the "suspended" state. Additionally or alternatively, in some implementations, the performance data in any given flow representation may include statistical information for any synchronization object that is used by the flow (or a thread that is part of the given flow). In some implementations, the statistical information for a synchronization object may identify how long the flow (or a thread that is part of the flow) has been in a suspended state when waiting for the synchronization object to become available. In some implementations, the duration for which a flow has been in a suspended state while waiting for a synchronization object to become available may be based on the sum of the durations for which individual threads within the flow have been in a suspended state while waiting for the synchronization object to become available.

Any synchronization object in the storage system may be associated with a set of one or more credits (e.g., tokens) for accessing a resource. The resource may be a software resource (e.g., a file or data structure, etc.) or a hardware resource (e.g., a communications port, communications interface, storage device, etc.). If a thread that is part of a flow wants to use a resource associated with the synchronization object, and there are available credits, the thread may withdraw a required number of credits from the synchronization object, at which time the total number of available credits is decremented by the number of the consumed credits. The available on a given synchronization object credits are renewed by so-called resource provider threads or hw-mechanisms. If a thread wants to use a resource associated with the object, and there are no available credits, the synchronization object is unavailable, and the thread may be forced to wait (in a suspended state) until credits become available. As can be readily appreciated, the credits for accessing a particular resource that is associated with a synchronization object may be used to limit the number of threads that can use the particular resource concurrently. The credits for accessing a particular resource that is associated with a synchronization object may be implemented as part of the synchronization object or in any suitable manner. In this regard, a credit that is being supplied to (or withdrawn from) a synchronization object that controls access to a particular resource may include any variable, any set of variables, any object, or any set of objects that can be used to limit the number of threads that can concurrently access the particular resource. Stated succinctly, the present disclosure is not limited for any specific implementation of "credits" for accessing a particular resource.

At step 808, a plurality of directed graphs is generated based on the plurality of flow representations. Each of the directed graphs may be generated based on a different one of the flow representations. As noted above, each directed graph may include a plurality of nodes connected by edges. In some implementations, each node may represent a different synchronization object, and each edge may represent a different processing sequence of instructions (that are part of one or more threads associated with the graph's corresponding flow), which are executed between consecutive accesses of two different synchronization objects. According to aspects of the disclosure, when a given thread is executed, it may continue executing until it reaches a point at which the given thread performs an access of a synchronization object. At this point, if the required number of credits is not present, the thread is suspended while the access to the synchronization object is pending, and another thread begins executing until the other thread also performs an access of the same or another synchronization object. In some implementations, each first directed graph may be generated in the manner discussed above with respect to FIGS. 4-7.

Figure 8C:
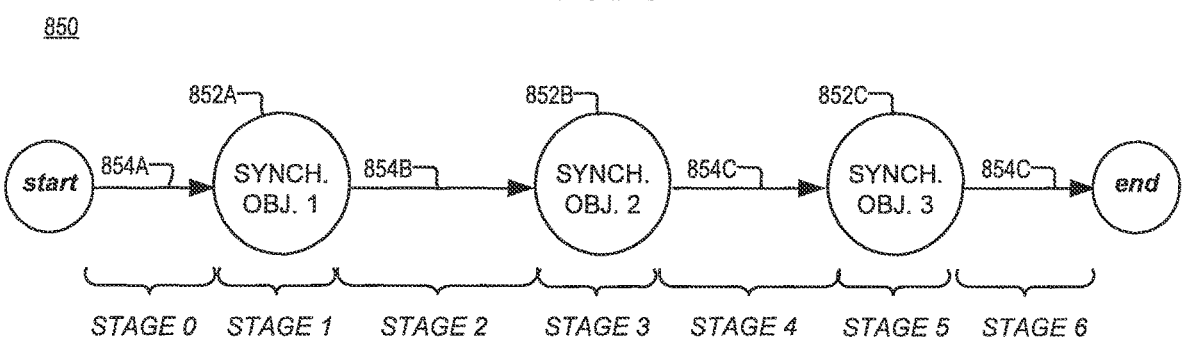
FIG. 8C is a diagram of an example of a graph, according to aspects of the disclosure.

FIG. 8C shows an example of a directed graph 850 that corresponds to a single flow that is executed in the storage system. Each of the nodes 852 represents a different synchronization object that is accessed by the flow, and each edge 854 corresponds to a different sequence of processor-executable instructions that are executed between accesses to different synchronization objects. As illustrated in FIG. 8C, the execution of the flow can be divided into several stages, herein referred to as stages 0-6. At stage 0, the flow alternates between being in the running state and the ready state, at stage 1, the flow is in the suspended state while waiting for synchronization object 1 to become available, at stage 2, the flow alternates between being in the running state and the ready state, at stage 3, the flow is in the suspended state while waiting for synchronization object 2 to become available, at stage 4 the flow alternates between being in the running state and the ready state, at stage 5, the flow is in the suspended state while waiting for synchronization object 3 to become available, and at stage 6 the flow alternates between being in the running state and the ready state. Although in the example of FIG. 8C, the graph 850 identifies the suspended time spent on all synchronization objects that are accessed by the flow, it will be understood that alternative implementations are possible in which the time spent on one or more synchronization objects is not shown in the graph 850. In such instances, the sequences of processor-executable instructions represented by the graph may be concatenations of neighboring stages. For example, in cases in which the access to the synchronization object 2 did not suspend the thread execution, due to the lack of credits, the synchronization object is not shown in the graph 850, there may be a single edge extending directly between nodes 852A and 852C.

Figure 8D:
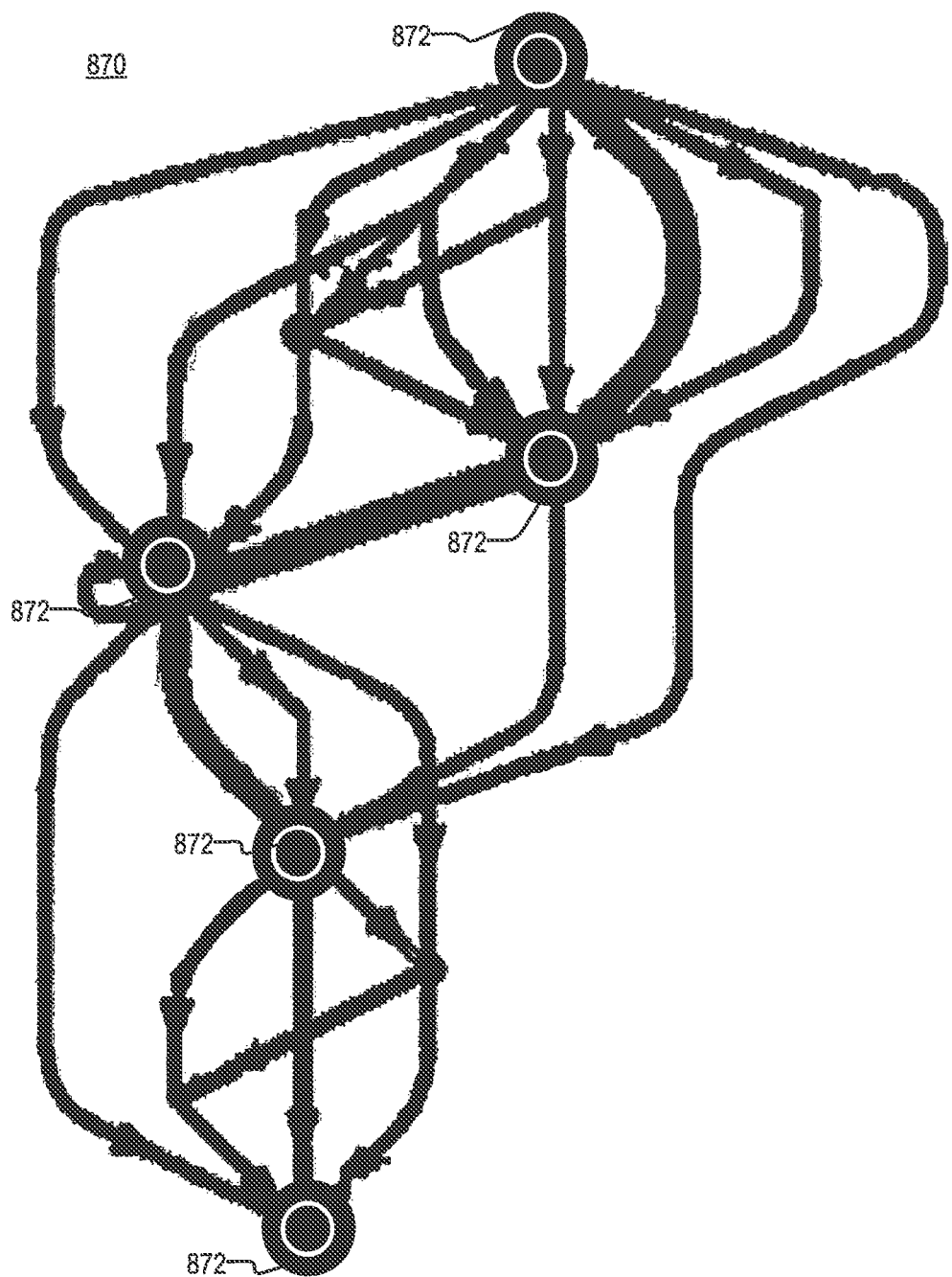
FIG. 8D is a diagram of an example of a graph, according to aspects of the disclosure.

Although in the example of FIG. 8C, the directed graph 850 represents a single flow instance (e.g., storage single thread), alternative implementations are possible in which a directed graph is generated that represents a statistics over multiple flow instances (e.g. multiple threads). In this regard, FIG. 8D shows an example of a graph 870 that is generated based on statistics calculated for a plurality of flow instances. In some implementations, the flow instances in the plurality may be executed in sequence (i.e., one after another), and together they may constitute what is herein referred to as an "combined flow." The graph 870 may thus show the sequence in which synchronization objects associated with the nodes 872 have been accessed by the combined flow. In particular, the graph 870 may show the average suspend time on various resources that were consumed by the combined flow (e.g., synchronization objects represented by the nodes 872) as well as the average time spent in "ready" and "running" state on each processing sequence (i.e., edge). In some implementations, the directed graph 870 may be represented in a tabular form by combining the respective representations of individual flows that are used to generate the graph 870.

Based on the flow representation of the combined flow associated with graph 870, the time spend by the combined flow (or different single/individual synchronous flows that are part of the combined flow) in each of the suspended state, the ready state, and the running state may be tabulated as illustrated by Table 1 below:

TABLE 1

| STATE | TIME SPEND IN THE STATE | END-TO-END LATENCY OF STORAGE SYSTEM |
|---|---|---|
| READY_load1 | 10 ms | 150 ms |
| RUNNING_load1 | 20 ms | 150 ms |
| SUSPENDED_load1 | 30 ms | 150 ms |
| READY_load2 | 40 ms | 350 ms |
| RUNNING_load2 | 19 ms | 350 ms |
| SUSPENDED_load2 | 60 ms | 350 ms |
| READY_load3 | 70 ms | 600 ms |
| RUNNING_load3 | 18 ms | 600 ms |
| SUSPENDED_load3 | 90 ms | 600 ms |
| READY_load4 | 100 ms | 800 ms |
| RUNNING_load4 | 17 ms | 800 ms |

Table 1 illustrates a sequence of state transitions that are undergone by the combined flow as the load on the storage system is increased. The transitions are listed in the order in which they have occurred. Each row in Table 1 corresponds to a single uninterrupted period for which one of the single (or individual) flows that constitute the combined flow is in a particular state, and it identifies the state, the duration of the uninterrupted period, and an end-to-end latency of the storage system during the uninterrupted period. According to the present example, the labels "load1, load2, load3, and load3" denote different levels of load experienced by the storage system while the flow is in the a particular state.

In one aspect, Table 1 illustrates that: (i) the end-to-end latency of the storage system increases with increase of the external load (during the load test), and (ii) the time spent by the flow in the ready and suspended states increases every time the load is growing. In some implementations, the rate at which the time spent by the flow in each state increases (or decreases) may be referred to as "latency growth" of the flow.

In another aspect, Table 1 illustrates that the duration of the time periods which the flow spends in a particular state increases for flow instances running under higher load. For example. Table 1 illustrates that under load1 the flow spends 10 ms in READY state. However, flow instances running under load2 spend 40 ms in that state, And under load3, flow instances 70 ms in it.

In some implementations, the growth of the duration of continuous periods which the flow instances spend in a given state may be referred to as "latency growth of the flow at the given processing graph entity." In this regard, Table 1 illustrates that the latency growth of the flow for the sus- pended state is positive—that is, every time the load is growing, the combined flow spends longer and longer in the suspended state.

Based on the flow representation of the combined flow associated with graph 870, the time spent by the combined flow waiting in the suspended state for a particular object may be tabulated as illustrated by Table 2 below:

TABLE 2

| STATE | TIME SPEND IN THE STATE | END-TO-END LATENCY OF STORAGE SYSTEM |
|---|---|---|
| SUSPENDED (Obj. 1) | 10 ms | 150 ms |
| SUSPENDED (Obj. 1) | 20 ms | 200 ms |
| SUSPENDED (Obj. 1) | 30 ms | 300 ms |

Each row in Table 2 represents a different continuous period in which the flow is in the suspended state while waiting to access the same synchronization object (e.g., synchronization object 1.) According to the example of Table 2, when the flow accesses the synchronization object for the first time, the flow may spend 10 ms in the suspended state while waiting for the synchronization object to become available; when the flow accesses the synchronization object for the second time, the flow may spend 20 ms in the suspended state while waiting for the synchronization object to become available; and when the flow accesses the synchronization object for the third time, the flow may spend 30 ms in the suspended state while waiting for the synchronization object to become available. Although in the present example Table 2 is generated based on the graph 850 (and/or a representation of the graph 850, such as a tabular representation), it will be understood that alternative implementations are possible in which Table 2 is generated based on the graph 870 (and/or a representation of the graph 870, such as a tabular representation).

In some implementations, the growth of the duration of continuous periods which the flow spends in the suspended state while waiting for a given synchronization object to become available may be referred to as "the latency growth of the flow for the particular object." In this regard, Table 2 illustrates that the latency growth of the flow for the synchronization object (e.g., synchronization object 1) is positive—that is, every time the flow attempts to access the synchronization object, the flow spends longer and longer the suspended stated before being given access.

In some aspects, when the latency growth of the flow with respect to the synchronization object correlates with the growth of the end-to-end latency of the storage system (during the period in which the flow is executed and when the storage system is under increasingly growing load), this may indicate that the synchronization object presents a bottleneck in the operation of the storage system. As is further discussed below, the bottleneck may be addressed by increasing the rate at which credits are issued for accessing the object (or the object's resource).

At step 810, one or more synchronous flows are identified that are executing IO requests when the system is in an increasingly loaded state. Typically, the storage system's latency grows non-linearly as a function of the rate of I/O requests, as illustrated in the region 842 of the plot 840 (shown in FIG. 8B). From some I/O rate (in proximity to the system I/O rate limit), the latency growth may become very sharp as illustrated by the region 844 of the plot 840 in which the plot 840 asymptotically approaches the system I/O rate limit. In this regard, the region 844 illustrates that, in some implementations, the loaded state of the storage system may be one in which the latency at which I/O requests are processed continues to grow while the rate at which the I/O requests are received by (or supplied to) the storage system remains approximately constant.

In some implementations, any of the synchronous flows may include one or more threads that are created when an I/O request is received at the storage. Additionally or alternatively, in some implementations, a synchronous flow may be a flow that is created synchronously to an incoming I/O-request for the purpose of handling this I/O request. In some implementations, synchronous flows may have a limited lifetime, which corresponds to the IO-processing latency of their corresponding I/O requests. In operation of the storage system, the system may notify a client submitting an I/O request indicating completion of the I/O request processing (from the client point of view). This part of the IO request processing corresponds to the synchronous flow. At the same time, the completion of the synchronous flow may not necessarily mean that the data associated with the I/O request is saved in permanent storage (e.g., on disk, such as SSD or hard disk). For example, instead of being stored in permanent storage, the data can be journaled in some intermediate memory location (e.g., stored in temporary storage). To move the data from temporary storage to permanent storage, the storage system may utilize background flows, whose purpose is to finalize the I/O-processing. Furthermore, in some implementations, background flows may perform other prolonged operations, such as garbage collection for instance.

In some implementations, the synchronous flow may perform one or more activities for a given specific I/O request whose aim is to store data associated with I/O requests to an intermediate location and format the data in a way that would guarantee that the data would not be lost. After the data is stored in the intermediate location, the synchronous flow may send a notification to a customer associated with the I/O request that the I/O request has been successfully completed and subsequently terminate itself. In some implementations, a background flow may perform one or more background activities. For example, a background flow may transfer the data from intermediate to permanent storage locations, and it may operate in its own pace in a cyclic way. In some respects, synchronous flows may be viewed as consuming free space in the intermediate memory and the background flows may be viewed as producing the free space in the intermediate memory by transferring the data to permanent storage, In some storage systems, there may be more than one type and level of the intermediate memory (or other resource), and, correspondingly, more than one type and level of the background flows. This way one can talk about chains and nets of resource consumer-producer dependencies between the flows. Synchronous flows are at the top of these chains/nets and the background flows of the lowest level are at the bottom. As used throughout the disclosure, the term "background flow" may refer to any flow that is arranged to perform background services and/or any flow that is arranged to supply respective credits to one or more synchronization objects.

At step 812, a synchronous flow is selected from the set determined at step 810. The present disclosure is not limited to any specific criterion for selecting the synchronous flow. According the present example, the selected synchronous flow is a combined flow as discussed above with respect to 8D.

At step 814, a determination is made of which state of the synchronous flow selected at step 812 contributes significantly to the execution time of the synchronous flow. As noted above, When the synchronous flow is executed, a first portion of latency of the synchronous flow may be attributable to the flow's constituent threads being in the "ready" state, a second portion of the latency of the flow may be attributable to the flow's constituent threads being in the "running" state, and a third portion of the flow's latency may be attributable to the flow's constituent threads being in the "suspended" state. According to the present example, the state that contributes significantly to the latency of the selected flow may be the state whose latency growth correlates to the greatest degree with the growth rate of the end-to-end latency of the storage system during the period in which the flow is executed. For instance, according to the present example, if the latency growth (as a function of load) of the selected flow for the suspended state correlates more closely to the growth of the end-to-end latency of storage system (during the period in which the selected flow is executed) than the latency growth of the selected flow for the ready state and the latency growth of the selected flow for the running state, the selected state would be determined to contribute significantly to the latency of the selected flow.

When the "running" state contributes significantly to the latency of the synchronous flow, this is an indication of a scalability problem, and the process 800 terminates. In some implementations, before terminating, the process 800 may generate and/or output a debugging message indicating the scalability problem and/or identifying the synchronous flow (and/or the synchronous' flow corresponding I/O request) as one that is being affected by the scalability problem.

When the "ready" state contributes significantly to the latency of the synchronous flow, this is an indication of a bounded CPU problem, and the process 800 terminates. In some implementations, before terminating, the process 800 may generate and/or output a debugging message indicating the bounded CPU problem and/or identifying the synchronous flow (and/or the synchronous' flow corresponding I/O request) as one that is being affected by the bounded CPU problem.

When the "suspended" state contributes significantly to the latency of the synchronous flow, this is an indication of a potential bottleneck that could be resolved by increasing the rate at which credits are supplied to a particular synchronization object, and the process 800 proceeds to step 812. At step 812, the synchronous flow is analyzed to determine whether the storage system can be tuned (e.g., reconfigured) to improve the performance of the storage system. In some implementations, step 812 may be performed in accordance with the process 900, which is discussed further below with respect to FIGS. 9A-B. After step 812 is completed, the process 800 is terminated.

According to aspects of the disclosure, the process 800 is provided as an example only. Although in the example of FIG. 8, only one synchronous flow is selected at step 812 it will be understood that alternative implementations are possible in which multiple synchronous flows are selected at step 812. In such instances, steps 812-816 may be performed once for each of the identified synchronous flows.

Figure 9A:
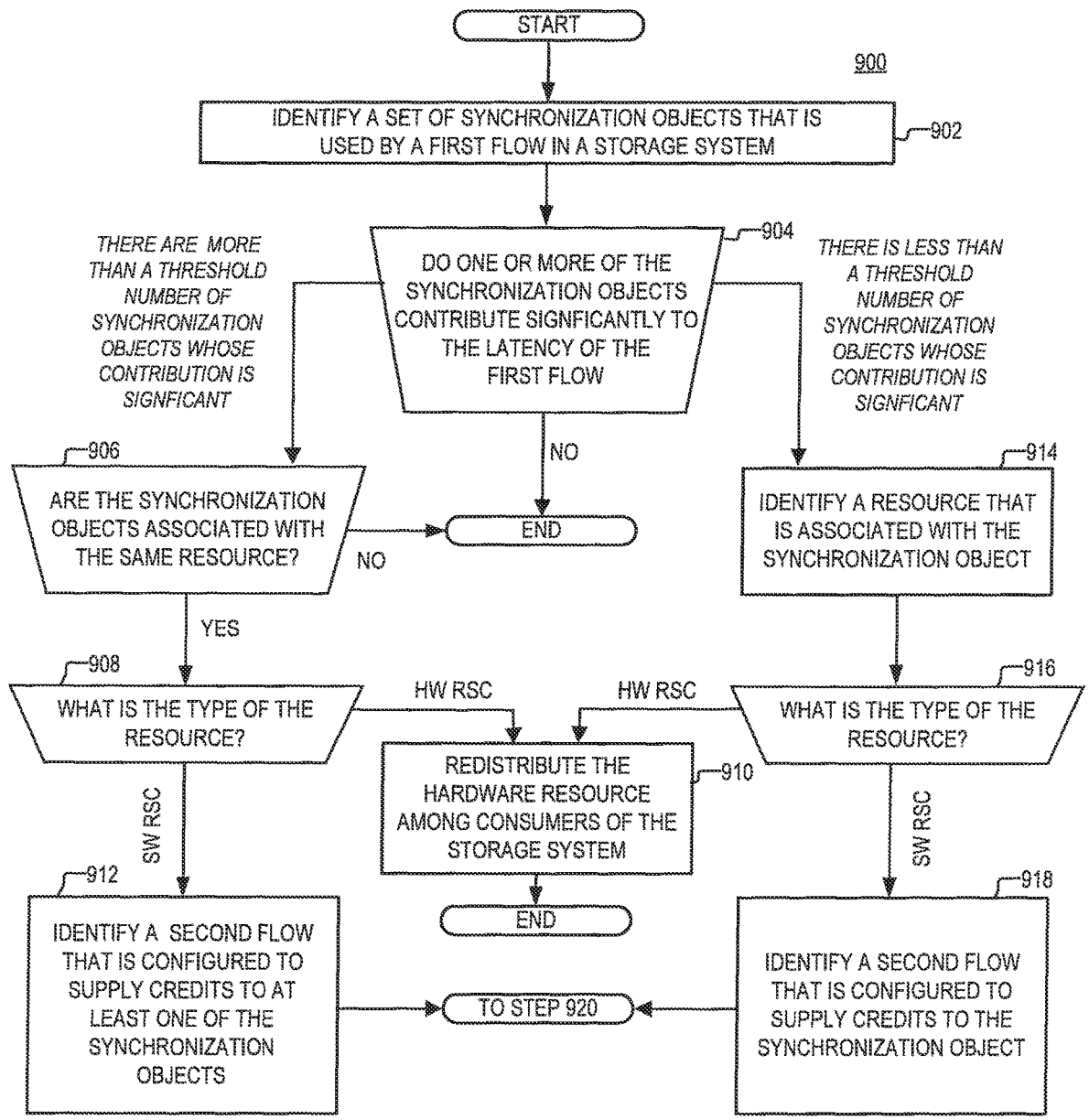
FIG. 9A is flowchart illustrating a first portion of a process associated with the process of FIG. 8A, according to aspects of the disclosure.
Figure 9B:
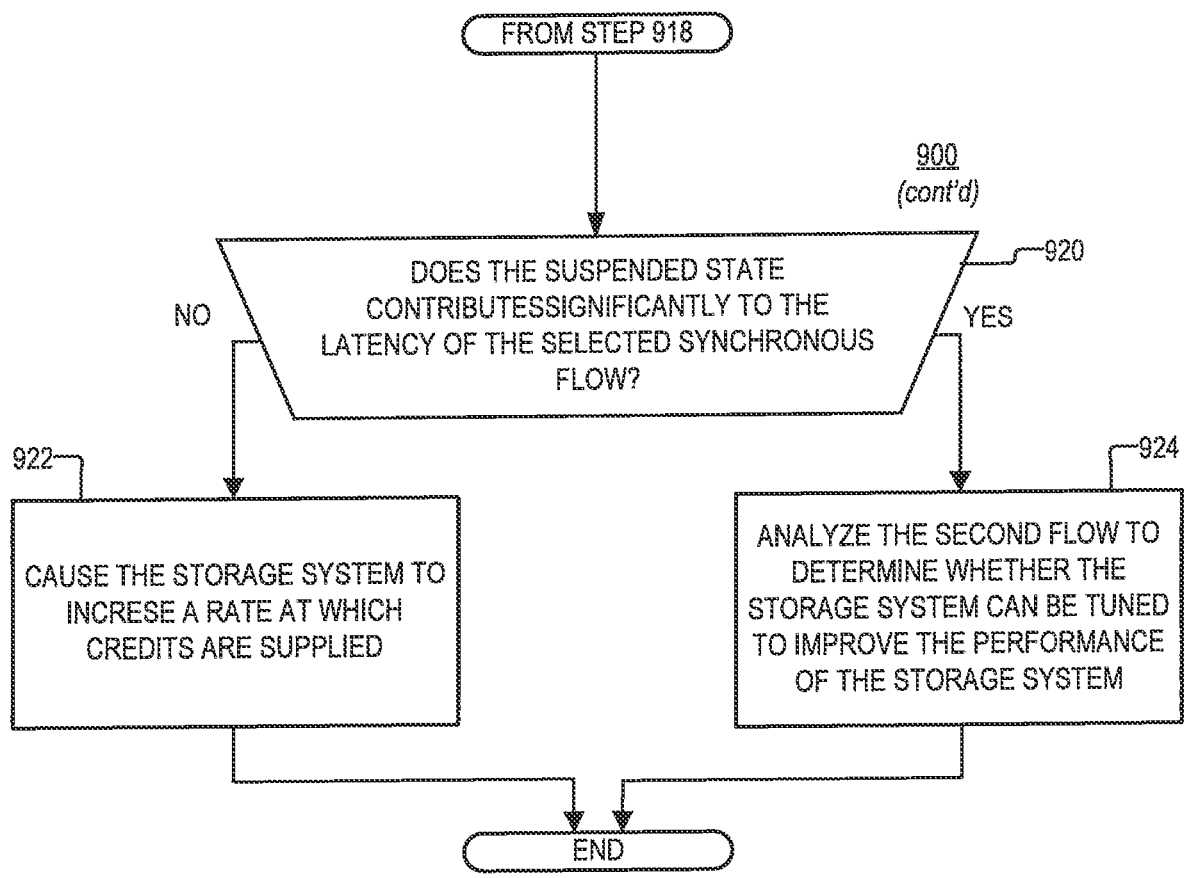
FIG. 9B is a flowchart illustrating a second portion of the process of FIG. 9A, according to aspects of the disclosure.

FIGS. 9A-B show a flowchart of a process 900 for analyzing a flow that is executed by a storage system to determine whether the performance of the storage system can be improved, according to aspects of the disclosure.

At step 902, a representation is obtained of a first flow that is executed in a storage system, and a set of synchronization objects that are used by the first flow is identified based on the representation. The first flow may be the same or similar to the synchronous flow that is selected at step 812, and the representation of the first flow may be the same or similar to a representation that is generated at step 806. In this regard, as noted above, the first flow according to the present example is a combined flow.

At step 904, a determination is made whether one or more of the synchronization objects have contributed significantly to the latency of the first flow. According to the present example, a synchronization object is considered to contribute significantly to the latency of the first flow if the latency growth of the first flow for the synchronization object exhibits above a threshold degree of correlation with the growth of end-to-end IO-processing latency of the storage system (e.g., 75% correlation or more, etc.) If there are more multiple synchronization objects whose contribution is significant, verify that all of them correspond to the same resource, the process 900 proceeds to step 908. If there are no synchronization objects whose contribution is significant, the process ends. If the resource is a HW resources, proceed to the 910; if the resource is a SW resource, proceed to 912/918.

At step 906, a determination is made whether the synchronization objects in the set identified at step 906 are associated with the same resource. According to the present example, a synchronization object is associated with the same resource if the synchronization object, at least in put, controls access to the resource. If the synchronization objects are not associated with the same resource, this is an indication that the system is well-balanced and operating at overcapacity. In such circumstances, the process 900 is terminated. Otherwise, if the synchronization objects are associated with the same resource, the process 900 proceeds to step 908.

At step 908, a determination is made whether the resource is a hardware resource or a software resource. If the resource is a hardware resource, the process 900 proceeds to step 910. Otherwise, if the resource is a software resource, the process 900 proceeds to step 912.

At step 910, the hardware resource is re-distributed among different flows of the storage system. In some implementations, re-distributing the resource may reconfiguring the storage system to make the resource more available to one flow at the expense of another. After step 910 is completed, the process 900 is terminated.

At step 912, at least one second flow is identified that is configured to supply credits to one or more of the synchronization objects that contribute significantly, as a group, to the latency of the first flow. In some implementations, the second flow may be a background flow, and identifying the second flow may include identifying background flows only, without taking into account any synchronous flows. According to aspects of the disclosure, the second flow may include one or more threads (e.g., provider threads) that use at least one of the synchronization objects that contribute significantly, as a group, to the latency of the first flow. In some implementations, when the second flow is identified, a representation for the second flow may be retrieved from a memory of the device executing the process 900. The representation of the second flow may be the same or similar to any of the flow representations discussed above with respect to step 804 of the process 800.

At step 914, a resource is identified that is associated with a synchronization object that contributes significantly to the latency of the first flow. As noted above, a resource may be associated with a synchronization object, if the synchronization object, at least in part controls access to the resource.

At step 916, the type of the resource is determined. If the resource is a hardware resource, the process 900 proceeds to step 910. Otherwise, if the resource is a software resource, the process 900 proceeds to step 918.

At step 918, a second flow is identified that is configured to supply credits to a synchronization object that contributes significantly, in its individual capacity, to the latency of the first flow. In some implementations, the second flow may be a background flow and identifying the second flow may include identifying background flows only, without taking into account any synchronous flows. According to aspects of the disclosure, the second flow may include one or more threads that use the synchronization object. In some implementations, when the second flow is identified, a representation for the second flow may be retrieved from a memory of the device executing the process 900. The representation of the second flow may be the same or similar to any of the flow representations discussed above with respect to step 804 of the process 800.

At step 920, a determination is made if the suspended state contributes significantly to the latency of the second flow. According to the present example, the determination can be made by detecting whether the flow's state-specific latency growth for the suspended state exhibits greater than a threshold correlation (e.g., 75% or more) with the growth of the end-to-end latency of the storage system.

At step 922, the storage system is caused to increase the rate at which credits are supplied to the synchronization object that is associated with the second flow (e.g., at least one of the synchronization objects identified at step 904). In some implementations, causing the storage system to increase the rate at which credits are supplied to the synchronization object may include configuring the storage system to instantiate a greater number of threads that supply credits to the synchronization object. Additionally or alternatively, in some implementations, causing the storage system to increase the rate at which credits are supplied to the synchronization object may include increasing the size of the second flow. Increasing the size of the second flow may include configuring the storage system to instantiate a greater number of threads that are part of the second flow. Additionally or alternatively, in some implementations, causing the storage system to increase the rate at which credits are supplied may include increasing the priority at which at least one thread that is part of the second flow is scheduled by a scheduler in the storage system.

At step 924, at least one of the second flows is analyzed to determine whether the storage system can be tuned (e.g., reconfigured) to improve its performance. In some implementations, step 924 may be performed by recursively executing the process 900 for the second flow. As a result of executing step 924, a third flow may be identified. The third flow may be one that is configured to supply credits to a synchronization object that contributes significantly to the latency of the second flow, either in its individual capacity or as part of a group of synchronization objects. This synchronization object may be different from the synchronization object(s) identified at step 94, with respect to the first flow, and it may control access to a software resource of the storage system, Which is different from the resources determined at steps 906 or 914, with respect to the first flow. After the third flow is identified, when suspended state contributes significantly to the latency of the first flow, the storage system may be configured to increase the rate at which credits are supplied to the synchronization object that contributes significantly (e.g., in its individual capacity or as part of a group, etc.) to the latency of the second flow.

Figure 10:
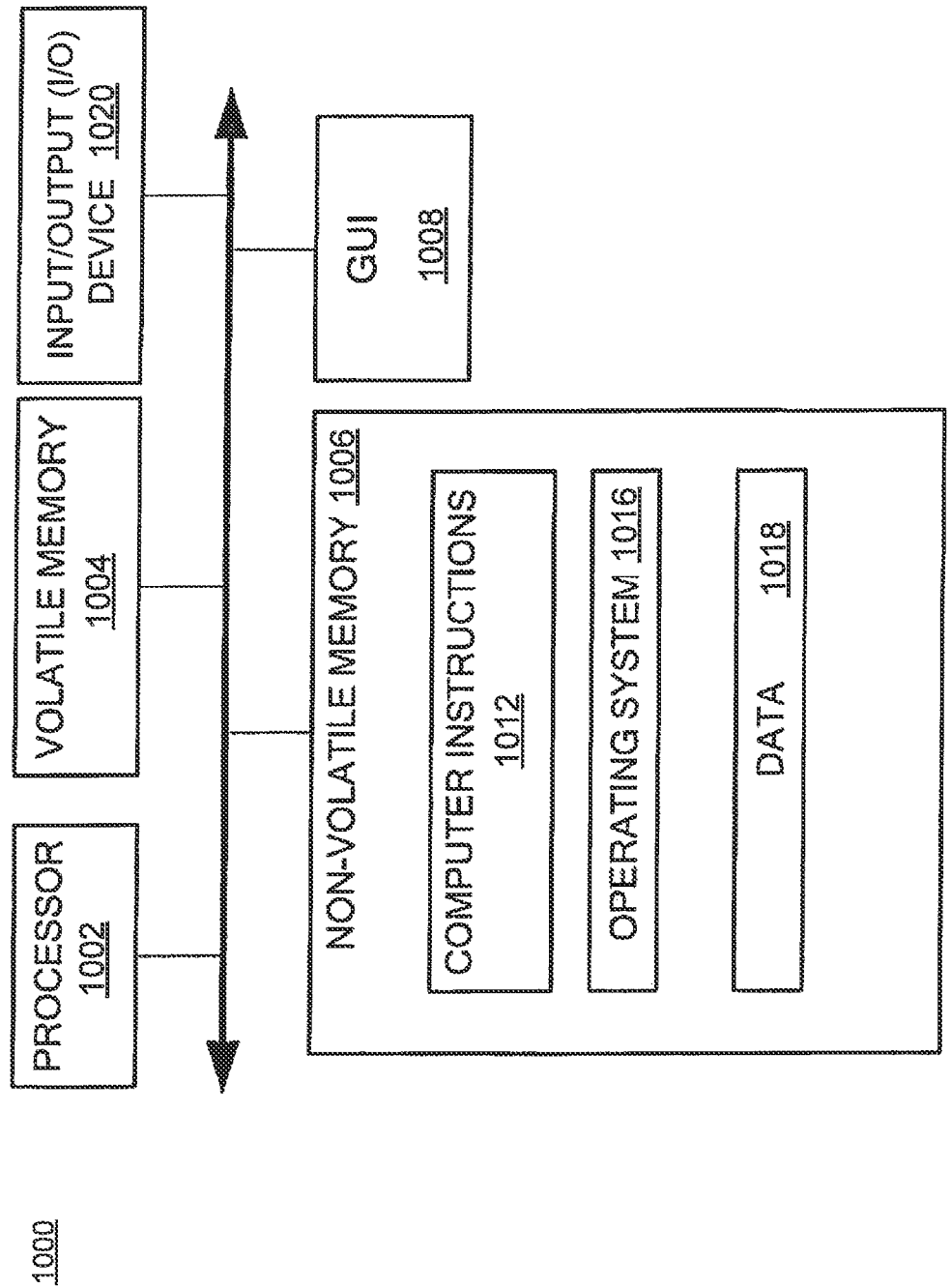
FIG. 10 is a diagram of an example of a computing device that can be used to execute any of the processes of FIGS. 8A and 9A-B, according to aspects of the disclosure.

Referring to FIG. 10, in some embodiments, source site 102 and/or target site 112 may be implemented as one or more computers. Computer 1000 may include processor 1002, volatile memory 1004 (e.g., RAM), non-volatile memory 1006 (e.g., a hard disk drive, a solid state drive such as a flash drive, a hybrid magnetic and solid state drive, etc.), graphical user interface (GUI) 408 (e.g., a touchscreen, a display, and so forth) and input/output (I/O) device 1020 (e.g., a mouse, a keyboard, etc.). Non-volatile memory 1006 stores computer instructions 1012, an operating system 1016 and data 1018 such that, for example, the computer instructions 1012 are executed by the processor 1002 out of volatile memory 1004 to perform at least a portion of processes 400 and 420' (FIGS. 4 and 5), Program code may be applied to data entered using an input device of GUI 1008 or received from I/O device 1020.

According to the present disclosure, any of the process 400, 420', 800, and 900 can be executed on the computer 1000. However, it will be understood that processes 400, 420', 800, and 900 are not limited to use with the hardware and software of FIG. 10 and may find applicability in any computing or processing environment and with any type of machine or set of machines that may be capable of running a computer program. Processes 400 and 420' (FIGS. 4 and 5) may be implemented in hardware, software, or a combination of the two.

The processes described herein are not limited to the specific embodiments described. For example, processes 400 and 420' are not limited to the specific processing order shown in FIGS. 4 and 5. Rather, any of the blocks of processes 400 and 420' may be re-ordered, combined or removed, performed in parallel or in serial, as necessary, to achieve the results set forth herein.

Processor 1002 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in an application specific integrated circuit (ASIC). In some embodiments, the "processor" may be embodied in a microprocessor with associated program memory. In some embodiments, the "processor" may be embodied in a discrete electronic circuit. The "processor" may be analog, digital or mixed-signal. In some embodiments, the "processor" may be one or more physical. processors or one or more "virtual" (e.g., remotely located or "cloud") processors. In some implementations, a thread may be created by instantiating the thread or retrieving the thread from a pool of available threads. In some implementations, a thread may be completed by terminating the thread or retrieving the thread to a pool of available threads. As noted above, any of the flows discussed with respect to FIGS. 8A-9B may include one or more threads. Thus in some implementations, the first and second flow discussed with respect to FIG. 9B may include one thread each. According to aspects of the disclosure, the term "thread" may refer to any sequence of processor-executable instructions that is independently controlled by a scheduler, without regard whether the scheduler is an operating system scheduler or a scheduler that is executed on top of the operating system.

While illustrative embodiments have been described with respect to processes of circuits, described embodiments may be implemented as a single integrated circuit, a multi-chip module, a single card, or a multi-card circuit pack. Further, as would be apparent to one skilled in the art, various functions of circuit elements may also be implemented as processing blocks in a software program. Such software may be employed in, for example, a digital signal processor, micro-controller, or general purpose computer. Thus, described embodiments may be implemented in hardware, a combination of hardware and software, software, or software in execution by one or more processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium, and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. A method for configuring a storage system to improve performance, comprising:
   identifying at least one synchronous flow that is executed by the storage system, the synchronous flow being executed in response to a plurality of I/O requests that are received at the storage system;
   identifying a first synchronization object that is used by the synchronous flow, the first synchronization object being configured to control access to a first resource based on availability of one or more first credits for accessing the first resource;

19 identifying at least one background flow that is configured to supply the first credits to the first synchronization object;

detecting whether a first latency growth that is associated with the background flow corelates with a second latency growth that is associated with the storage system; and when the first latency growth correlates with the second latency growth, causing the storage system to increase a rate at which the first credits are supplied to the first synchronization object by the background flow.

2. The method of claim 1, wherein:
the first latency growth incudes growth in respective durations of periods spent by the background flow in a suspended state, and
the second latency growth includes an end-to-end latency growth of the storage system.

3. The method of claim 1, further comprising executing a load test on the storage system, wherein identifying at least one synchronous flow includes identifying at least one synchronous flow that is executed by the storage system when the storage system is experiencing an increasing load.

4. The method of claim 1, wherein identifying at least one synchronous flow includes identifying at least one synchronous flow that is executed by the storage system when the storage system is in a state in which: (i) I/O requests are provided to the storage system at a rate that is approximately constant, and (ii) a latency of the I/O requests increases at a rate that is greater than a second threshold.

5. The method of claim 1, wherein the second latency growth that is associated with the storage system is calculated as a function of increasing external load on the storage system.

6. The method of claim 1, wherein:
the synchronous flow includes one or more threads that are configured to store data associated with the I/O request into temporary storage, and
the background flow includes one or more threads that are configured to transfer data from the temporary storage into permanent storage.

7. The method of claim 1, wherein causing the storage system to increase the rate at which the first credits are supplied to the first synchronization object includes at least one of: (i) increasing a size of the background flow, and (ii) increasing a priority of at least one thread that is part of the background flow.

8. The method of claim 1, wherein the at least one synchronous flow includes a combined flow.

9. A system comprising:
a memory; and
one or more processors operatively coupled to the memory, configured to:
identify at least one synchronous flow that is executed by a storage system, the synchronous flow being executed in response to a plurality of I/O requests that are received at the storage system;
identify a first synchronization object that is used by the synchronous flow, the first synchronization object being configured to control access to a first resource based on availability of one or more first credits for accessing the first resource;
identify at least one background flow that is configured to supply the first credits to the first synchronization object;

20 detect whether a first latency growth that is associated with the background flow corelates with a second latency growth that is associated with the storage system; and when the first latency growth correlates with the second latency growth, cause the storage system to increase a rate at which the first credits are supplied to the first synchronization object by the background flow.

10. The system of claim 9, wherein:
the first latency growth incudes growth in respective durations of periods spent by the background flow in a suspended state, and
the second latency growth includes an end-to-end latency growth of the storage system.

11. The system of claim 9, wherein:
the one or more processors are further configured to execute a load test on the storage system, and
identifying at least one synchronous flow includes identifying at least one synchronous flow that is executed by the storage system when the storage system is experiencing a load that is greater than a threshold load as a result of the load test being performed.

12. The system of claim 9, wherein identifying at least one synchronous flow includes identifying at least one synchronous flow that is executed by the storage system when the storage system is in a state in which: (i) I/O requests are provided to the storage system at a rate that is approximately constant, and (ii) a latency of the I/O requests increases at a rate that is greater than a second threshold.

13. The system of claim 9, wherein the second latency growth that is associated with the storage system is calculated as a function of increasing external load on the storage system.

14. The system of claim 9, wherein:
the synchronous flow includes one or more threads that are configured to store data associated with the I/O request into temporary storage, and
the background flow includes one or more threads that are configured to transfer data from the temporary storage into permanent storage.

15. The system of claim 9, wherein causing the storage system to increase the rate at which the first credits are supplied to the first synchronization object includes at least one of: (i) increasing a size of the background flow, and (ii) increasing a priority of at least one thread that is part of the background flow.

16. The system of claim 9, Wherein the at least one synchronous flow includes a combined flow.

17. A non-transitory computer-readable medium storing one or more processor-executable instructions, which when executed by one or more processors cause the one or more processors to perform the operations of:
identifying at least one synchronous flow that is executed by a storage system, the synchronous flow being executed in response to a plurality of I/O requests that are received at the storage system;
identifying a first synchronization object that is used by the synchronous flow, the first synchronization object being configured to control access to a first resource based on availability of one or more first credits for accessing the first resource;
identifying at least one background flow that is configured to supply the first credits to the first synchronization object;

detecting whether a first latency growth that is associated with the background flow corelates with a second latency growth that is associated with the storage system; and when the first latency growth correlates with the second latency growth, causing the storage system to increase a rate at which the first credits are supplied to the first synchronization object by the background flow.

18. The non-transitory computer readable medium of claim 17, wherein:

the first latency growth incudes growth in respective durations of periods spent by the background flow in a suspended state, and the second latency growth includes an end-to-end latency growth of the storage system.

19. The non-transitory computer readable medium of claim 17, wherein identifying at least one synchronous flow includes identifying at least one synchronous flow that is executed by the storage system when the storage system is in a state in which: (i) I/O requests are provided to the storage system at a rate that is approximately constant, and (ii) a latency of the I/O requests increases at a rate that is greater than a second threshold.

20. The non-transitory computer readable medium of claim 17, wherein the synchronous flow includes an average synchronous flow.

* * * * *